3,008,912
RUBBER COMPOSITION CONTAINING THE REACTION PRODUCT OF LEAD OXIDE WITH A PHENOLIC RESIN, AND LIQUID ADHESIVE COMPRISING SAME
Thomas C. Morris, Lexington, Alexander D. Macdonald, Newton, Cyril W. Roop, Cambridge, and Conrad Rossitto, Lawrence, Mass., assignors to B.B. Chemical Co., Boston, Mass., a corporation of Massachusetts
No Drawing. Filed June 11, 1956, Ser. No. 590,351
7 Claims. (Cl. 260—31.2)

This invenention relates to a new class of solvent soluble reinforcing agents for rubbery polymers and to adhesive solutions containing the same.

A substantial amount of work has been done in developing non-sulfur vulcanizing agents toward the end of forming cured rubber products which possess properties not possessed by sulfur vulcanized rubbers, or which avoid difficulties presented by sulfur vulcanization. Synthetic resins of the substituted phenol-aldehyde type in which the phenols have only two reaction-favorable positions in the molecule have been stated to have vulcanizing properties. According to workers in such combinations, the "vulcanization" is due to reaction between the rubber and the resin. Phenolic resins having only two reaction favorable positions are stated to have a slower resin-to-resin reaction rate than simple phenolic resins, and it is stated that this lower reaction rate allows the rubber-resin reaction to occur. While the products of this reaction resemble cured rubbers, the strength and other properties have fallen short of the properties of sulfur vulcanized rubber.

It is a feature of the present invention to provide an improved non-sulfur curing agent soluble in organic solvents and effective to coact with rubbery diene polymers to give a high strength rubbery product.

It is a further feature to provide a new adhesive solution for providing high strength bonds to surfaces.

We have found that the organic solvent-insoluble oxide of lead can be caused to react with substituted phenol-aldehyde resins to form substantially infusible, organic solvent-soluble products containing a high content of the metal in chemically bound form. These products provide a reinforcing action with rubbery diene polymers which in certain combinations and even without heating is markedly stronger than the product containing the rubbery polymer and resin alone.

The resin-lead oxide product is formed by reaction of the lead oxide and the substituted phenol aldehyde resin in organic solvent solution to form a liquid solution of lead-resin reaction product. The solution may be added to a rubber solution to form a curing type adhesive or coating but the mixture may be stable only for relatively short periods. We have discovered that the instability causing property of the curing agent may be eliminated by removing or coagulating the small fraction of the metal-resin reaction product which is insoluble in organic solvents and remains suspended in the reaction mixture.

The compounds which possess the new high strength imparting action are the products of reacting heat advancing, oil soluble, alkali catalyzed condensates of monosubstituted phenols with the oxide of lead. The reaction is effected by dispersing the lead oxide in finely divided form in a solution of the resinous material in a volatile aromatic hydrocarbon solvent. Reaction is exothermic and occurs at room temperature. The reaction product is a combination of the metal oxide material with the resin as a lead-resin compound which is soluble in organic solvents but insoluble in water. Progress of the reaction may be followed by observing the progressive solution of the metal oxide. It is believed that a definite compound is formed since the amount of lead oxide capable of reaction with a resin to form a soluble compound is a fixed amount for any given resin.

The resins useful in the present reaction are the heat advancing, oil soluble, alkali catalyzed condensates of alkyl or aryl monosubstituted phenols and an aldehyde. It has been found that the substituent must contain at least three carbon atoms since solubility of the resin in the organic solvent to bring it into a state suitable for reaction is dependent on and increases with the size of the substituent group. Preferred phenolic constituents of the resin are para-tertiary-amyl phenol, para-tertiary-butyl phenol, and para-phenyl phenol. The resins also are characterized in having a high methylol content such as is obtained through a relatively high ratio of aldehyde such as formaldehyde to the phenol. This ratio must be greater than 1:1 and may be as high as 2:1.

In this resins the methylol groups appear to offer points of exceptional reactivity and perhaps of adhesion. The ease with which they form salts with lead oxide and the solubility of the salts in a wide variety of solvents, coupled with their substantial infusibility, make them extremely useful in solvent cements. Acid catalyzed resins which do not possess the methylol groups showed no evidence of reaction with the lead oxide and no increase in melting point or in effectiveness of coaction with rubbery polymers.

Lead-resin reaction products according to the present invention in which the methylol groups are largely or completely reacted with lead are substantially infusible. That is, they show no sign of melting at temperatures up to 200° C., at which temperature they show signs of thermal decomposition.

Lead-resin compounds contain from about 25% to 30% of lead, depending on the resin, and are stable compounds possessing exceptional ability to provide high strength products.

The reaction product of the substituted phenol aldehyde resins and lead oxide provides initially a physical effect so that films deposited from solutions of the rubbery polymer and the magnesium-resin product will initially redissolve when treated with solvent. The infusible lead-resin product cooperates with the rubbery polymer, in which it is soluble, both to raise the melting point of the combination to give superior resistance to heat and to make the mixture tougher and stronger because of the hardness of the resin.

A further action in addition to the physical action is obtained with lead oxide through its non-sulfur vulcanizing action on a given rubbery polymer. This class of lead-resin compound gives the two-fold action of presenting the metal in a soluble form in which it can react most efficiently with the rubbery polymer and at the same time providing the physical effect discussed above which gives greater heat resistance and greater toughness and strength.

Thus in a polychloroprene base adhesive including lead-resin compounds the initial bond strength of the adhesive often doubles in the space of two days, and in many instances the final bond strength has been found to be several times the initial bond strength. As little as five parts of the lead-resin reaction product with 100 parts of polychloroprene in a solvent type adhesive will give on aging an improvement in bond strength of approximately 300% whether tested at room temperature or at the 140° F. test required by certain military specifications.

The new agents produce an extremely effective reinforcing or curing action on polychloroprene rubbers. They are also effective to coact with other vulcanizable diene polymer rubbers to give desirable properties. Thus improvement in strength, heat resistance and other physical properties are obtained by combining the lead resin products with rubbers such as natural rubber, butadiene-acrylonitrile copolymer rubbers, and butadiene-styrene copolymer rubbers.

The reaction product of lead oxide and resin may be used either in the reaction solution for combination with rubber solutions or may be dried to a brittle, infusible solid. This solid may be redissolved for combination with rubber solutions or may be incorporated in finely ground condition into rubber mixes.

Rubber solutions in which reaction solutions of the lead resin products are incorporated tend to be unstable to the extent that separation or floc formation occurs in a matter of weeks. This difficulty of instability is not encountered in rubber solutions containing curing agent which had been dried and then redissolved. This behavior is believed by applicants to be due to the presence in the reaction solution of suspended insoluble matter which causes instability in solutions of rubbers in which it is present. It is believed that the process of drying the initial solution causes coagulation of the suspended matter to a condition in which it is no longer effective to cause instability.

The resin which is reacted with lead oxide is a mixture of molecules some part of which may be of higher molecular weight or more complex structure than the main body of the resin due to the nature of the condensation of substituted phenols and aldehydes. It is believed probable that the insoluble matter is the reaction product of the lead oxide with these higher molecular weight or more complex molecules. This explanation is advanced as of possible assistance but it is to be understood that the patentability is not based on its correctness. The instability causing factor is eliminated where the insoluble matter is coagulated as by drying of the solution and this factor is important in fitting the reaction product for use in forming stable rubber solutions.

Elimination of the insoluble matter may also be achieved by filtration, long settling, and other techniques and it is to be understood that the term "substantially free from uncoagulated solvent insoluble components" refers to products in which the insoluble materials have been rendered inactive to cause instability either by coagulation as in drying or by physical separation as by filtration.

Solutions of the lead-resin compounds are particularly valuable for use in adhesives of the rubber base type. These adhesives may be prepared by simple solution of the rubber component in a suitable volatile organic solvent followed by admixture of the solution of the lead-resin compound. Adhesive solutions containing the lead-resin compounds which have been dried and redissolved, or otherwise treated to remove unevaporated suspended matter, show excellent stability so that in many cases they serve as complete one-part curing adhesives which can take the place of previously required two-part adhesives in which vulcanization accelerators and vulcanization activators have had to be incorporated in separate parts of the adhesive and mixed immediately before use. Up to 10 parts of lead-resin compound in a body of adhesive containing 100 parts of polychloroprene or a butadiene-acrylonitrile copolymer rubber has been found stable over substantial periods; but use of over 100 parts of the lead-resin compound with 100 parts of the rubber causes slow vulcanization at room temperature with gelling.

The preceding disclosure has been concerned primarily with the use of the lead-resin compounds in solution in volatile organic solvents. However, the dry, brittle, lead-resin compound recovered from the solution as by evaporation of the solvent may be combined with a natural or synthetic rubber in conventional milling procedures and appears to dissolve in the rubber on the mill. Such milled compositions may be molded or extruded by standard procedures and the final products possess curing characteristics comparable to those obtainable with sulfur. The rubbery compounds cured with the lead-resin compound are particularly valuable in that they tend to filter out ultraviolet light and therefore protect polychloroprene and butadiene-acrylonitrile copolymer rubbers from attack by such light. Additionally, the lead-resin compound is valuable in imparting heat stability.

The following examples are given to aid in understanding the invention and it is to be understood that the invention is not restricted to the particular proportions, materials or conditions set forth therein.

*Example I*

Alkali catalyzed resinous condensate of paraphenyl phenol and formaldehyde containing more than one mol of formaldehyde per mol of the paraphenyl phenol (Bakelite Resin BR–3360) was dissolved to form a 40% by weight solution in a mixed solvent comprising 25 parts by volume of toluene, 10 parts by volume of ethyl acetate and 65 parts by volume of petroleum naphtha. Finely divided sublimed lead oxide was added to the resulting solution in amount to provide 35% by weight based on the weight of the resin in the solution. The lead oxide added was vigorously stirred into the resin solution. The lead oxide and resin reacted with evolution of heat, followed by a darkening of the solution and a noticeable disappearance of the lead oxide and increase in viscosity. The reaction was allowed to proceed for seven hours with occasional stirring and the reaction mixture was then allowed to stand overnight. Solid material settled out of the solution and the clear supernatant liquid was decanted and filtered.

A portion of the liquid was dried over a steam bath, all traces of volatile matter being removed by vacuum drying at 70° C. for five hours at the end of the steam bath drying. The dried material was a brittle, somewhat glassy looking solid which was readily ground. Combustion analysis of the dried material showed a lead oxide content of about 27% lead calculated as lead oxide. The brittle, glassy material was infusible and showed no signs of softening at temperatures as high as 200° C. This material was, however, soluble in solvents of the type used in its preparation.

*Example II*

A series of adhesive mixtures was prepared by adding successively greater amounts of a 35% by weight solution of the lead-resin reaction product prepared according to Example I and adjusting the polychloroprene weight percent to 15% by addition of further solvent mixture.

Coatings of the resultant adhesive mixtures painted on polychloroprene-coated fabric, allowed to dry for 30 minutes, second coatings were applied and allowed to dry one hour, and the adhesive-coated surfaces were then pressed together with ¾" overlap. Strips 2" wide were cut and dead load shear tests were run as indicated in the following table:

| Parts of lead-resin reaction product on 100 of polychloroprene | Dead load shear test at 140° F. | | | | | | | | Dead load shear test at R.T., 11-days aging | |
|---|---|---|---|---|---|---|---|---|---|---|
| | 1-day aging | | 4-days aging | | 6-days aging | | 11-days aging | | | |
| | Lbs. | Type of failure | Lbs. | Type of failure | Lbs. | Type of failure | Lbs. | Type of failure | Lbs. | Type of failure |
| 5 | 43.7 | C.F.[1] | 110 | C.F. | 143 | C.F. | 175 | C.F. | 487 | S.F.[2] |
| 10 | 52 | C.F. | 108 | C.F. | 137 | C.F. | 183 | C.F. | 430 | S.F. |
| 15 | 56.5 | C.F. | 142.5 | C.F. | 189 | C.F. | 232 | C.F. | 490 | S.F. |
| 20 | 53.7 | C.F. | 173 | C.F. | 178 | C.F. | 268 | P.C.F.[3]/P.S.F. | 495 | S.F. |
| 25 | 59 | C.F. | 169 | C.F. | 200 | P.C.F./P.S.F. | 257 | S.F. | 493 | S.F. |
| 30 | 54 | C.F. | 193 | C.F. | 242 | P.C.F./P.S.F. | 265 | S.F. | 445 | S.F. |
| 35 | 74.5 | C.F. | 247 | P.C.F./P.S.F. | 257 | P.C.F./P.S.F. | 270 | S.F. | 477 | S.F. |
| 40 | 79.8 | C.F. | 265 | P.C.F./P.S.F. | 277 | S.F. | 276 | S.F. | 463 | S.F. |

[1] C.F. means that failure occurred in the cement film.
[2] S.F. means failure occurred in the surface.
[3] $\frac{P.C.F.}{P.S.F.}$ means failure partially in the cement film and partially in the surface.

The results above listed show that even five parts of the lead-resin product on 100 of the polychloroprene gives an adhesive which after six days' aging exceeds the requirements of the MIL–C–5540 specifications which call for a dead load strength of 125 lbs. at 140° F.

It will be observed that the strength of the adhesive bond, which is quite high initially, more than trebles in 11 days' aging.

Films deposited from the adhesive solutions were tested after 11 days' aging and were found to be insoluble, which indicates that a definite cure had taken place.

Adhesive mixtures containing up to 10 parts of the lead resin product on 100 parts of the polychloroprene were found to be stable on storage for a period of months during which time apparently no undesirable curing of the polychloroprene occurred. Adhesives of this character give properties equal to or superior to previous two-part cements and offer substantial advantages in ease of handling over such cements.

*Example III*

The following is a table listing the results of milling, molding, and curing mixtures of natural and synthetic rubbers with resin additives. Normal milling procedure was employed and the milled material was disposed in a standard dumbbell-shaped test mold.

| Formula | | Cure time, min. | Cure temp., ° F. | Tensile at break, lbs./sq. in. | Hardness, Shore "A" |
|---|---|---|---|---|---|
| 1. Butadiene-styrene copolymer (GRS1000) | 100 | 60 | 305 | 1,185 | 50 |
| Carbon black | 50 | | | | |
| Paraphenyl phenol-aldehyde resin | 11.1 | | | | |
| | 161.1 | | | | |
| 2. Butadiene-styrene copolymer (GRS1000) | 100 | 60 | 305 | 1,902 | 60 |
| Carbon black | 50 | | | | |
| Paraphenyl phenol-aldehyde resin | 11.1 | | | | |
| Litharge | 10 | | | | |
| | 171.1 | | | | |
| 3. Butadiene-styrene copolymer (GRS1000) | 100 | 60 | 305 | 2,935 | 67 |
| Carbon black | 50 | | | | |
| Lead-resin product of Example I | 15 | | | | |
| | 165 | | | | |
| 4. Butadiene acrylonitrile copolymer (43% acrylonitrile) | 100 | 30 | 305 | 2,740 | 65 |
| Stearic acid | 2 | | | | |
| Carbon black | 50 | | | | |
| Paraphenyl phenol-aldehyde resin | 11.1 | | | | |
| Litharge | 10 | | | | |
| | 173.1 | | | | |
| 5. Butadiene acrylonitrile copolymer (43% acrylonitrile) | 100 | 30 | 305 | 3,050 | 67 |
| Stearic acid | 2 | | | | |
| Carbon black | 50 | | | | |
| Lead-resin reaction, product of Example I | 15 | | | | |
| | 167 | | | | |
| 6. Polychloroprene | 100 | 15 | 270 | 3,510 | 59 |
| Lead-resin reaction, product of Example I | 15 | | | | |
| Stearic acid | 2 | | | | |
| Carbon black | 50 | | | | |
| | 162 | | | | |
| 7. Natural rubber | 100 | 60 | 305 | 2,580 | 75 |
| Antioxidant | 1 | | | | |
| Stearic acid | 4 | | | | |
| Carbon black | 50 | | | | |
| Lead-resin reaction, product of Example I | 15 | | | | |
| | 170 | | | | |

It is to be observed by comparison of the first three compositions in the table that the lead-resin reaction product possesses a curing action which is something above and beyond the effects of the materials from which it is formed. That is, the strength of the product cured with the lead-resin reaction product is nearly 200% greater than the rubber product with the resin alone, and is more than 50% greater than the product obtained through separate incorporation of the two components which are reacted in the lead-resin product.

Formulas 4 and 5 likewise demonstrate that the lead-resin reaction product possesses a curing action on butadiene-acrylonitrile rubber which is above and beyond the cumulative effects of the materials of which it is formed. Thus the strength of the product cured with the lead-resin reaction product is markedly greater than the product obtained through separate incorporation of the two components which are reacted to form the lead-resin product.

The tests also show that the lead-resin reaction product is effective for curing rubbers to give satisfactory products equivalent to those normally obtainable only with sulfur type vulcanization.

Having thus described our invention, what we claim as new and desire to secure by Letters Patent of the United States is:

1. A stable liquid adhesive comprising a volatile organic solvent solution of a vulcanizable rubber from the group consisting of polychloroprene, butadiene acrylonitrile copolymer rubber, butadiene styrene copolymer rubber, and natural rubber and from 5% to 100% by weight based on the weight of the rubber of the aromatic hydrocarbon solvent soluble, substantially infusible product of reacting before addition to the rubber lead oxide with a heat-advancing, oil-soluble, alkali-catalyzed condensate of a mono-substituted phenol of which the substituent group is a saturated hydrocarbon containing at least three carbon atoms, and an aldehyde in proportion greater than one mol of aldehyde to one mol of the substituted phenol.

2. A stable liquid adhesive comprising a volatile organic solvent solution of a vulcanizable rubber from the group consisting of polychloroprene, butadiene acrylonitrile copolymer rubber, butadiene styrene copolymer rubber, and natural rubber and from 5% to 100% by weight based on the weight of the rubber of the aromatic hydrocarbon solvent-soluble, substantially infusible product of reacting before addition to the rubber lead oxide with a heat-advancing, oil-soluble, alkali-catalyzed condensate of a mono-substituted phenol of which the substituent group is a saturated hydrocarbon containing at least three carbon atoms, and an aldehyde in proportion greater than one mol of aldehyde to one mol of the substituted phenol, said product containing from about 25% to about 30% by weight of combined lead calculated as PbO.

3. A curable composition comprising a mixture of a vulcanizable rubber from the group consisting of polychloroprene, butadiene acrylonitrile copolymer rubber, butadiene styrene copolymer rubber, and natural rubber and from 5% to 100% by weight based on the weight of the rubber of the aromatic hydrocarbon solvent-soluble, substantially infusible product of reacting before addition to the rubber lead oxide with a heat-advancing, oil-soluble, alkali-catalyzed condensate of a mono-substituted phenol of which the substituent group is a saturated hydrocarbon containing at least three carbon atoms, and an aldehyde in proportion greater than one mol of aldehyde to one mol of the substituted phenol.

4. A curable composition comprising a mixture of a vulcanizable rubber from the group consisting of polychloroprene, butadiene acrylonitrile copolymer rubber, butadiene styrene copolymer rubber, and natural rubber and from 5% to 100% by weight based on the weight of the rubber of the aromatic hydrocarbon solvent-soluble, substantially infusible reaction product of reacting before addition to the rubber lead oxide with a heat-advancing, oil-soluble, alkali-catalyzed condensate of a mono-substituted phenol of which the substituent group is a saturated hydrocarbon containing at least three carbon atoms, and an aldehyde in proportion greater than one mol of aldehyde to one mol of the substituted phenol, said product containing from about 25% to about 30% by weight of combined lead calculated as PbO.

5. A curable composition comprising a mixture of polychloroprene and from 5% to 100% by weight based on the weight of the polychloroprene of the aromatic hydrocarbon solvent-soluble, substantially infusible product of reacting before addition to the polychloroprene lead oxide with a heat-advancing, oil-soluble, alkali-catalyzed condensate of a mono-substituted phenol of which the substituent group is a saturated hydrocarbon containing at least three carbon atoms, and an aldehyde in proportion greater than one mol of aldehyde to one mol of the substituted phenol, said product containing from about 25% to about 30% by weight of combined lead calculated as PbO.

6. A curable adhesive comprising a volatile organic solvent solution of polychloroprene and from 5% to 100% by weight based on the weight of the rubber of a solvent soluble substantially infusible product of reacting before addition to said polychloroprene lead oxide and a heat-advancing oil-soluble alkali-catalyzed condensate of a mono-substituted phenol of which the substituent group is a saturated hydrocarbon containing at least three carbon atoms and an aldehyde in proportion greater than one mol of aldehyde to one mol of the substituted phenol.

7. An adhesive comprising a volatile organic solvent solution of polychloroprene and from 5% to 10% by weight based on the weight of the polychloroprene of a solvent soluble substantially infusible product of reacting before addition to said polychloroprene lead-oxide and a heat-advancing oil-soluble alkali-catalyzed condensate of a mono-substituted phenol of which the substituent group is a saturated hydrocarbon containing at least three carbon atoms and an aldehyde in proportion greater than one mol of aldehyde to one mol of the substituted phenol, said reaction product comprising from about 25% to about 30% by weight of combined lead calculated as PbO.

References Cited in the file of this patent

UNITED STATES PATENTS

| | | |
|---|---|---|
| 1,697,885 | Seebach | Jan. 8, 1929 |
| 2,060,625 | Kranzlein et al. | Nov. 10, 1936 |
| 2,288,533 | Kreidl et al. | June 30, 1942 |
| 2,424,787 | Adams | July 29, 1947 |
| 2,610,910 | Thomson | Sept. 16, 1952 |
| 2,725,981 | Abere et al. | Dec. 6, 1955 |
| 2,736,718 | Webber | Feb. 28, 1956 |
| 2,918,442 | Gerrard et al. | Dec. 22, 1959 |

FOREIGN PATENTS

| | | |
|---|---|---|
| 357,259 | Great Britain | Sept. 24, 1931 |